United States Patent
Park et al.

[11] Patent Number: 5,775,887
[45] Date of Patent: Jul. 7, 1998

[54] SPACER CONFIGURATION FOR A DISCHARGE REED VALVE OF A HERMETIC TYPE COMPRESSOR

[75] Inventors: Jae Sang Park, Busan; Jae Mun Hwang, Masan, both of Rep. of Korea

[73] Assignee: L. G. Electronics Inc., Seoul, Rep. of Korea

[21] Appl. No.: 699,544

[22] Filed: Aug. 19, 1996

Related U.S. Application Data

[62] Division of Ser. No. 631,528, Apr. 12, 1996, Pat. No. 5,676,533.

[30] Foreign Application Priority Data

Apr. 20, 1995 [KR] Rep. of Korea .................. 9354/1995
Jun. 12, 1995 [KR] Rep. of Korea .................. 13141/1995
Jun. 12, 1995 [KR] Rep. of Korea .................. 15360/1995

[51] Int. Cl.$^6$ .................. F04B 39/10; F16K 15/16; F04C 29/00
[52] U.S. Cl. .................. 417/569; 417/571; 137/856; 137/857
[58] Field of Search .................. 417/569, 571; 137/855, 856, 857

[56] References Cited

FOREIGN PATENT DOCUMENTS

| 55-24276 | 2/1980 | Japan | 137/856 |
| 60-8577 | 1/1985 | Japan | 137/855 |
| 1044818 | 9/1983 | U.S.S.R. | 417/569 |

*Primary Examiner*—Timothy Thorpe
*Assistant Examiner*—Ted Kim
*Attorney, Agent, or Firm*—Ostrolenk, Faber, Gerb & Soffen, LLP

[57] ABSTRACT

A hermetic type compressor which makes opening and closing of a exhaust valve installed inside a reentrant groove formed in a cylinder head smooth, and prevents leakage of refrigerant from the exhaust valve by fabricating a valve seat surface to be in the same height as that of a valve fixing surface. The hermetic type compressor includes a cylinder head containing an exhaust hole through which compressed refrigerant is discharged from the inside a cylinder and having a valve seat surface in its outer periphery, and a reentrant groove having a valve fixing surface and a fixed groove formed therein; an exhaust valve installed so as to be open or shut on the upper surface of the exhaust hole; a valve spring disposed on the exhaust valve for defining the operation of the exhaust valve; a retainer having a fixed end for fixing the exhaust valve and valve spring in its one end, and having in its other end a flexible part for controlling the variance of the exhaust valve and valve spring and another fixed end which is extended from the flexible part and is fixed in the fixed groove of the reentrant groove; a head cover for covering the cylinder head on the retainer; and a packing inserted between the cylinder head and the head cover for preventing the leakage of the refrigerant.

1 Claim, 9 Drawing Sheets

SPACER CONFIGURATION FOR A DISCHARGE REED VALVE OF A HERMETIC TYPE COMPRESSOR

RELATED APPLICATION

This is a division of application Ser. No. 08/631,528, filed Apr. 12, 1996, now U.S. Pat. No. 5,676,533.

BACKGROUND OF THE INVENTION

The present invention relates to a hermetic type compressor, and more particularly, to a hermetic type compressor which makes opening and closing of an exhaust valve installed inside a reentrant groove formed in a cylinder head smooth, and prevents leakage of refrigerant from the exhaust valve by fabricating a valve seat surface to be in the same height as that of a valve fixing surface.

In a hermetic type compressor used in a cooling system such as a refrigerator, the discharge system of the cylinder greatly improves the compressor.

The operation of a general compressor is performed such that a rotor is rotated by the electromagnetic operation of a stator and the rotor, and a crank shaft is rotated by the rotation of the rotor. The vertical rotary power of the crank shaft is converted into the horizontal movement by a connecting rod and a slider so that a piston reciprocally moves within the cylinder.

At this time, when a piston (not shown) proceeds, the refrigerant is led inside a cylinder through a suction hole and a suction valve of the cylinder head. The thusly incoming refrigerant is compressed by the forward operation of the piston and then is exhausted through the exhaust hole of the cylinder head while opening the exhaust valve.

In designing the conventional hermetic type compressor operable in the above-described manner, the efficiency of the compressor has been improved by reducing the so-called dead volume of the volume formed in the inner upper portion of the cylinder when the piston reciprocating inside the cylinder reaches an upper dead point of the internal volume of the exhaust hole (to be explained below) connected thereto. This is because the high-pressure refrigerant gas which may remain inside the dead volume in the compressed gas discharging process, expands by the backward operation of the piston in the suction stroke of the cylinder, which impedes the suction of the refrigerant gas via the suction hole, thereby lowering the efficiency of the compressor.

The above-mentioned exhaust hole is formed in the cylinder head and is connected to the internal space of the cylinder up to the place where the exhaust hole is shut by the exhaust valve.

On the other hand, a valve device installed between the cylinder used in the conventional hermetic type compressor and a head cover for sucking and exhausting the refrigerant gas into the cylinder is largely divided into two types, that is one is constituted by a suction valve, a cylinder head, a packing and an exhaust valve, each composed of a plate and sequentially assembled, and the other includes a reentrant groove in the cylinder head, an exhaust valve, etc. formed in the reentrant groove.

In the valve device used in the above-described types of hermetic type compressors, the latter one is mainly used, which will now be explained inclusive of a well-known U.S. Patent.

Figure 1:
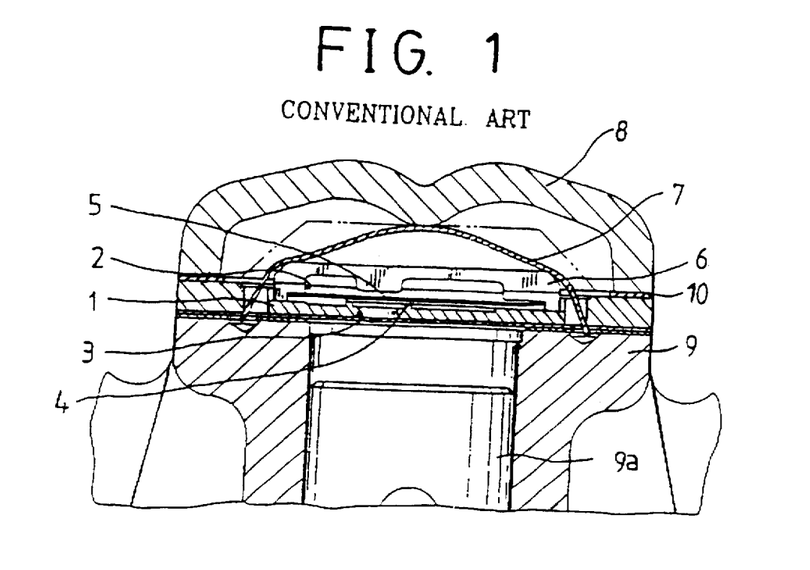
FIG. 1 is a cross-sectional view of a conventional valve device used in a hermetic type compressor disclosed in the U.S. Pat. No. 4,723,896.

A conventional valve device used in a hermetic type compressor disclosed in the U.S. Pat. No. 4,723,896 (to be referred as a cited art 1), includes a reentrant groove 2 for housing a discharge valve device in a cylinder head 1, as shown in FIG. 1.

The reentrant groove 2 is provided with an exhaust hole 3. An exhaust valve 4 for covering the exhaust hole 3 is disposed above the exhaust hole 3.

A valve spring 5 for returning the exhaust valve 4 from the opened state to the covered state is disposed above the exhaust valve 4.

The valve spring 5 is coupled to a retainer 6 fixed in the reentrant groove 2 of the cylinder head 1. The above-mentioned elements are fixed by a clamp 7 installed above the retainer 6.

These components are disposed between a head cover 8 and a cylinder 9. Also, the head cover 8 and cylinder head 1 are provided with a packing 10 for preventing the leakage of high-temperature and high-pressure refrigerant, the packing 10 being compactly installed therebetween.

Undefined reference numeral 9a is a piston.

However, since the valve device used in the hermetic type compressor according to the aforementioned conventional cited art No. 1 includes various components such as the exhaust valve 4, valve spring 5 and retainer 6, the device becomes complex. Also, since a groove for inserting the clamp 7 should be formed in the cylinder head 1, the operational efficiency is lowered.

Also, since the valve spring 5 is fixed by using the retainer 6, the shape of the valve spring 5 is deformed by the exhaust valve 4 to let the valve spring 5 touch the retainer 6, which deforms the retainer 6. Thus, various components abnormally operate.

Figure 2:
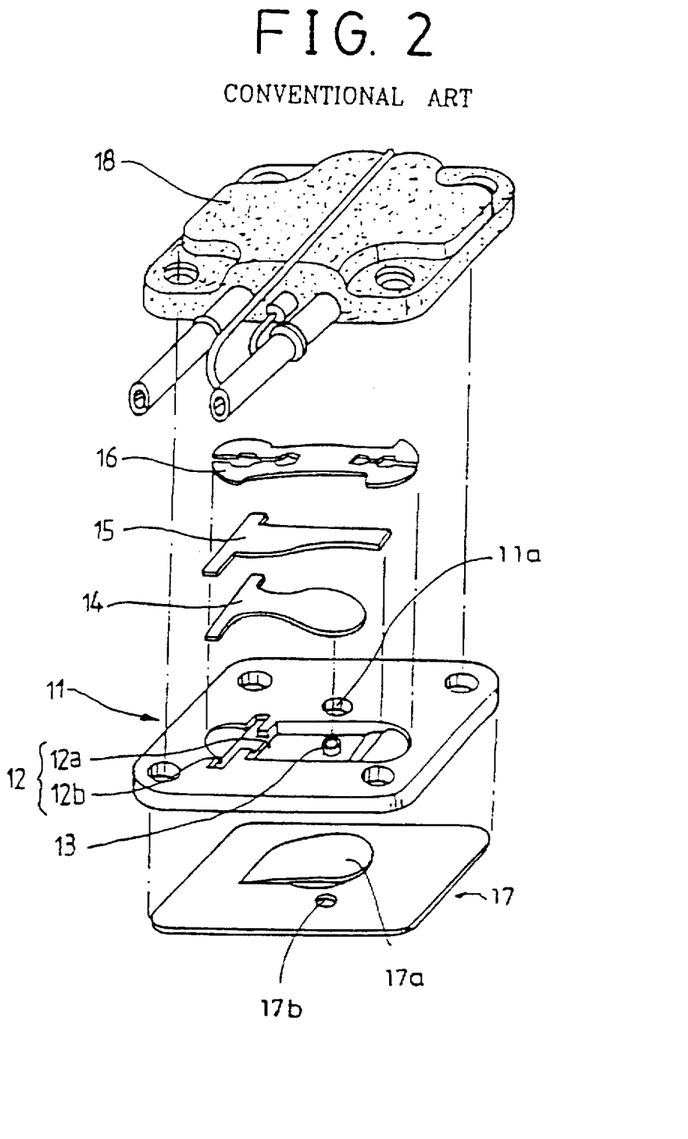
FIG. 2 is an exploded perspective view of a conventional valve device used in a hermetic type compressor disclosed in the U.S. Pat. No. 5,209,260.

Another conventional valve device used in a hermetic type compressor disclosed in the U.S. Pat. No. 5,209,260 (to be referred as a cited art No. 2) includes a suction valve plate 17, a cylinder head 11, an exhaust valve 14, a valve spring 15, a retainer 16 and a head cover 18, being sequentially locked with a cylinder (not shown), as shown in FIG. 2.

Hereinbelow, the structure of the above-mentioned components will be described in more detail.

A suction valve 17a and a discharge hole 17b are formed in the central portion of the suction valve 17.

A reentrant groove 12 having a first acceptance unit 12a and a second acceptance unit 12b formed stepwise is formed in one side of the central portion of the cylinder head 11.

The first acceptance unit 12a is formed more below than the second acceptance unit 12b. An exhaust hole 13 is formed in the central portion of the first acceptance unit 12a.

The exhaust valve 14 and valve spring 15 are sequentially disposed in one inner end of the first acceptance unit 12a, with the exhaust valve 14 opening or shutting the discharge hole 13 and the valve spring 15 defining the opening range of the exhaust valve 14.

A suction hole 11a opened or shut by the suction valve 17a of the suction valve plate 17 is formed in one outer end of the reentrant groove 12.

The retainer 16 fixedly installed in the second acceptance unit 12b formed more below than the first acceptance unit 12a within the reentrant groove 12 of the cylinder head 11 is positioned above the exhaust valve 14 and the valve spring 15 sequentially stacked in the reentrant groove 12.

At this time, since the retainer 16 buried in the second acceptance unit 12b is very strongly fixed in the cylinder head 11, a clamp as mentioned in the cited art No. 1 is not necessarily installed.

Undefined reference numeral 18 is a head cover.

However, the valve device used in the hermetic type compressor according to the aforementioned conventional cited art No. 2 requires many small components, which makes the assembly work burdensome.

Also, since the retainer 16 fixed in the cylinder head 11 is elevated when the valve device operates, which causes the deformation of the central portion of the retainer 16. Thus, the valve spring 15 stops in a state where it deviates from a predetermined position. As the result, the opening/closing time of exhaust valve 14 cannot be suitably adjusted to cause a backward flowing and great re-expansion loss of the compressed refrigerant, so that the efficiency of the compressor is lowered.

Figure 3:
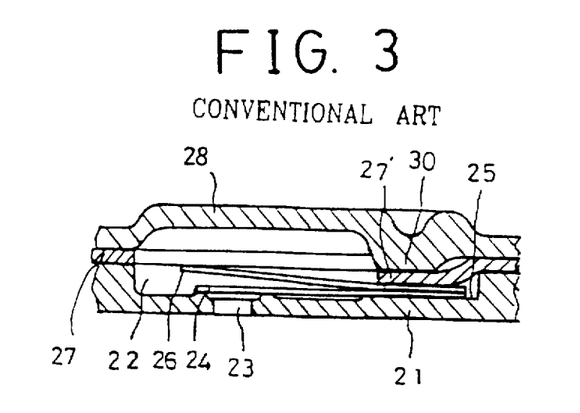
FIG. 3 is a cross-sectional view of a conventional valve device used in a hermetic type compressor disclosed in the U.S. Pat. No. 5,328,338.

According to still another conventional valve device used in a hermetic type compressor disclosed in the U.S. Pat. No. 5,328,338 (to be referred as a cited art No. 3), a reentrant groove 22 of a predetermined shape is formed in a cylinder head 21 and an exhaust hole 23 is formed inside the reentrant groove 22.

A valve installing surface 25 into which one end of an exhaust valve 24 for opening or shutting the exhaust hole 23 is housed is formed inside the cylinder head 21.

A valve spring 26 having an upward slope for defining the opening range of the exhaust valve 24 is disposed above the exhaust valve 24.

An extension 27' of a packing 27 positioned between the cylinder head 21 and a head cover 28 is disposed above the exhaust valve 24 and valve spring 26 sequentially disposed within the reentrant groove 22.

An introversive protrusion 30 is formed inside the head cover 28, being above the extension 27' of the packing 27. Thus, when the head cover 28 and cylinder head 21 are assembled, the extension 27' of the packing 27 is pressed by the introversive protrusion 30 while one end of the exhaust valve 24 and that of the valve spring 26 are being fixed.

In more detail, in order to fix the exhaust valve 24 and valve spring 26 at a constant position, the extension 27' of the packing 27 is placed at one end of the exhaust valve 24 and that of the valve spring 26 (the opposite end where the exhaust valve 24 covers the discharge hole 23), thereby pressingly fixing the extension 27'.

Therefore, according to the cited art No. 3, only the exhaust valve 24 and valve spring 26 are installed in the reentrant groove 22 formed in the cylinder head 21, without installing a retainer, by which the valve spring 25 is fixed by forming the introversive protrusion 30 in the head cover 28.

However, in the compressor according to the conventional cited art No. 3 having the aforementioned structure, although the number of components installed in the reentrant groove 22 is reduced, compared to the conventional cited art No. 1, the introversive protrusion 30 is formed in the head cover 28 to reduce the components installed in the reentrant groove 22, thereby pressingly fixing the exhaust valve 24 and valve spring 26.

Therefore, in the assembly of a valve device, it is not easy to assemble the head cover 28 and cylinder head 21 in a state where the exhaust valve 24 and valve spring 26 are positioned inside the reentrant groove 22 and the extension 27' of the packing 27 is inserted into the introversive protrusion 30. In order to assemble the head cover 28 exactly, the introversive protrusion 30 should be exactly shaped.

Further, since there is not provided with a retainer for defining the elevation of the valve spring 26, the valve spring 26 cannot be fixed efficiently and the elevation range of the valve spring 26 is not limited.

Since much stress is applied to the fixed end for fixing the valve spring 26, the packing 27 which is subject to the force by the repeated elevation of the valve spring 26 is easily damaged, so that the valve spring 26 and exhaust valve 24 may not be fixed at a constant position.

Figure 4:
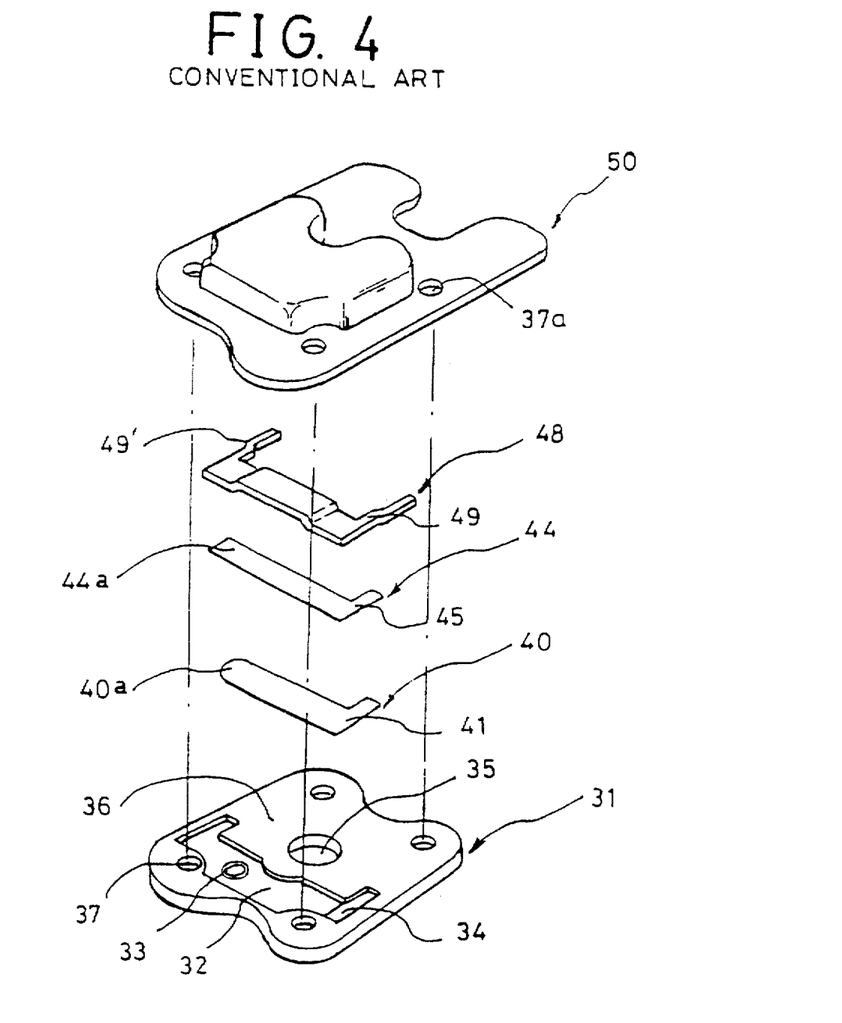
FIG. 4 is an exploded perspective view of another conventional valve device used in a hermetic type compressor.

A reentrant groove 32 having an exhaust hole 33 is formed in one side of the upper surface of the cylinder head adopted in the valve device used in according to the still another hermetic type compressor (to be referred as a cited art No. 4, hereinbelow), and a suction hole 35 is formed in the other side thereof, as shown in FIG. 4.

A valve fixing surface 34 formed stepwise with respect to the bottom surface of the reentrant groove 32 is formed in one end of the reentrant groove 32.

A fixed piece 41 integrally formed in one end of the exhaust valve 40 is housed in the valve fixing surface 34 of the reentrant groove 32. A flexible end 40a, the other end of the exhaust valve 40, is compactly installed above the exhaust hole 33.

Figure 5:
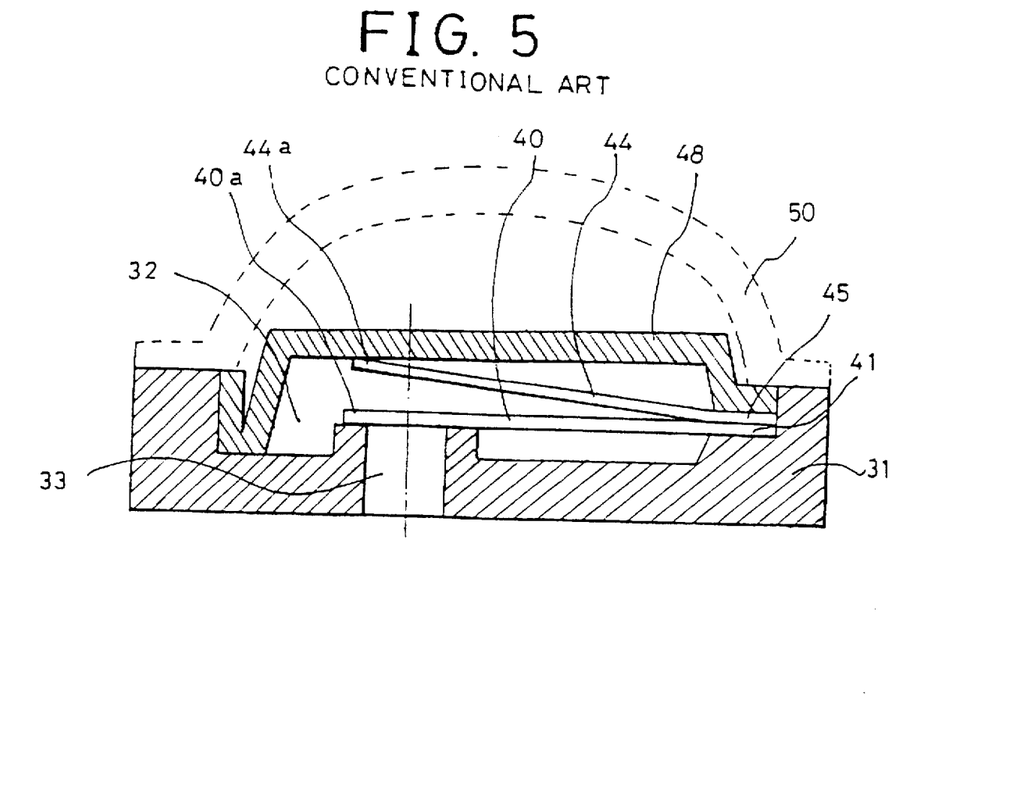
FIG. 5 is a cross-sectional view of the conventional valve device used in the hermetic type compressor shown in FIG. 4.

A spring fixed piece 45 integrally formed in one end of the valve spring 44 is positioned on the fixed piece 41 of the exhaust valve 40. A flexible end 44a, the other end of the valve spring 44, is upwardly sloped, as shown in FIG. 5.

The valve spring 44 limits the opening range and timing of the exhaust valve 40 properly.

In other words, when a piston (not shown) is proceeded to compress the refrigerant, the exhaust valve 40 is exactly shut by the valve spring 44, thereby compressing the refrigerant exactly.

Also, when the piston is retroceded to suck in low-pressure refrigerant, the exhaust valve 40 is exactly shut, thereby preventing the high-pressure refrigerant being inside the head cover 50 from being counter-flown into the cylinder.

There is provided a valve stopper 48 having housing fixed units 49 and 49' downwardly bent in both ends. Of the housing fixed unit 49 and 49', the housing fixed unit 49 being in one end, housed above the valve fixing piece 41 and spring fixing piece 45 sequentially housed above the valve fixing surface 34, fixes the exhaust valve 40 and valve spring 44 by the locking of The cylinder head 31 and head cover 50.

The head cover 50 is locked by screws inserted into screw holes 37 and 37a formed in the cylinder head 31 and head cover 50 in a state where the head cover 50 is housed with a packing (not shown) inserted on the upper surface 36 of the cylinder head 31.

The operation of the valve device used in the hermetic type compressor according to the conventional cited art No. 4 having the aforementioned structure will now be described. The refrigerant gas compressed by the compression stroke of a piston is discharged while pushing the exhaust valve 40 compactly being in touch with the exhaust hole 33 within the reentrant groove 32 of the cylinder head 31. If the discharge is completed, the piston starts a suction stroke so that the pushed exhaust valve 40 is restored by the interaction of the elasticity of the valve spring 44 and exhaust valve 40 and the pressure of the cylinder and the reentrant groove 32, thereby shutting the exhaust hole 33.

The thus-operated exhaust valve 40 is limited in the opening timing and range thereof by the valve spring 44.

However, in order to control the opening timing and range of the exhaust valve 40 properly, the flexible end 40a of the exhaust valve 41 covering the exhaust hole 33 of the reentrant groove 32 and the flexible end of the valve spring 44 should be maintained by a constant distance.

According to the conventional cited art No. 4, in order to maintain the constant distance, the valve spring 44 is let to have a predetermined slope so that the distance between the exhaust valve 40 and valve spring 44 is adjusted.

However, since it is not easy to assemble to exactly form the distance by the sloped valve spring 44, the distance gap occurs frequently during the assembly work.

In other words, if the distance between the exhaust valve 40 and valve spring 44 is improperly adjusted so that the distance therebetween becomes smaller, the exhaust valve 40 and valve spring 44 become closer to each other, which makes the discharge of the high-pressure refrigerant difficult, thereby lowering the efficiency of the compressor.

On the contrary, if the distance between the exhaust valve 40 and valve spring 44 becomes larger, the distance therebetween becomes distant, so that the counterflow of the high-pressure refrigerant remaining in the reentrant groove 32 of the cylinder head 31 occurs during the suction stroke, thereby lowering the efficiency of the compressor.

In the valve-incorporated cylinder head as described above, a valve fixing surface and a valve seat surface must be generally formed in the same height within a constant measurement range to compactly contact the exhaust valve with the valve seat surface, so that the leak between the exhaust valve and the valve seat surface is not generated, thereby maximizing the efficiency of the compressor.

However, in fabricating the valve seat surface in the conventional cylinder head, the valve fixing surface of a coarse state unprocessed after being sintered is adopted. Therefore, even though the valve seat surface is precisely fabricated, due to large deviation in size, it is not easy to make the valve fixing surface and valve seat surface be the same height within a constant measurement range.

Therefore, in fixing the valve fixing surface side by housing the exhaust valve into the valve fixing surface and the valve seat surface of a coarse state, which is unprocessed after being sintered, a gap is generated between the exhaust valve and the valve seat surface, which causes the leakage of the refrigerant. Then, the compressed and discharged high-pressure refrigerant is reversely flown during the suction stroke of the piston and then is suck in the cylinder, thereby lowering the volume efficiency of the compressor.

SUMMARY OF THE INVENTION

Therefore, it is an object of the present invention to provide a hermetic type compressor which can simplify the structure of a valve device and supply a cylinder head having a confined size with flexible space of an exhaust valve and a valve spring.

It is another object of the present invention to provide a hermetic type compressor having a cylinder head with a valve fixing surface and a valve seat surface so that a leakage between an exhaust valve and the valve seat surface is prevented.

It is still another object of the present invention to provide a hermetic type compressor which maintains the opening range and timing of an exhaust valve exactly by forming the distance between the exhaust valve and a valve spring exactly.

To accomplish the above objects, there is provided a hermetic type compressor according to the present invention comprising: a cylinder head containing an exhaust hole through which compressed refrigerant is discharged from the inside a cylinder and having a valve seat surface in its outer periphery, and a reentrant groove having a valve fixing surface and a fixed groove formed therein; an exhaust valve installed so as to be open or shut on the upper surface of the exhaust hole; a valve spring disposed on the exhaust valve for defining the operation of the exhaust valve; a retainer having a fixed end for fixing the exhaust valve and valve spring in its one end, and having in its other end a flexible part for controlling the variance of the exhaust valve and valve spring and another fixed end which is extended from the flexible part and is fixed in the fixed groove of the reentrant groove; a head cover for covering the cylinder head on the retainer; and a packing inserted between the cylinder head and the head cover for preventing the leakage of the refrigerant.

Also, according to another aspect of the present invention, there is provided a hermetic type compressor comprising: a cylinder head containing an exhaust hole through which compressed refrigerant is discharged from the inside a cylinder and having a valve seat surface in its outer periphery, and a reentrant groove having a valve fixing surface and a fixed groove formed therein; an exhaust valve installed so as to be open or shut on the upper surface of the exhaust hole and disposed such that a fixed piece formed in its one side is positioned in a valve fixing surface; a valve spring whose spring fixing piece formed in its one side contacts the upper surface of the exhaust valve; a spacer installed between the exhaust valve and the valve spring; a valve stopper installed in the upper surface of the valve spring for defining the upward movement of the valve spring; a head cover for covering the cylinder head on the retainer; and a packing inserted between the cylinder head and the head cover for preventing the leakage of the refrigerant.

According to still another aspect of the present invention, there is provided a hermetic type compressor comprising: a cylinder head having an exhaust hole through which compressed refrigerant is discharged from the inside the cylinder and having a valve seat surface, and a fixed part to which the exhaust valve and valve spring are fixed and trimmed and processed so as to be formed in the same height as that of the exhaust hole.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 7:
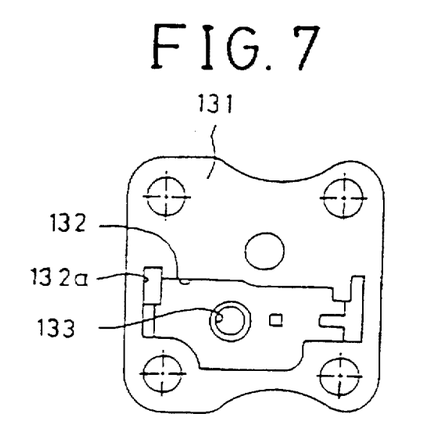
FIG. 7 is a plan view showing a cylinder head of the valve device used in the hermetic type compressor according to a first embodiment of the present invention.

In one end of the upper surface of a cylinder head 131 used in a hermetic type compressor according to a first embodiment of the present invention, there is provided a reentrant groove 132 having an exhaust hole 133 through which refrigerant gas is discharged, as shown in FIG. 7.

Figure 6:
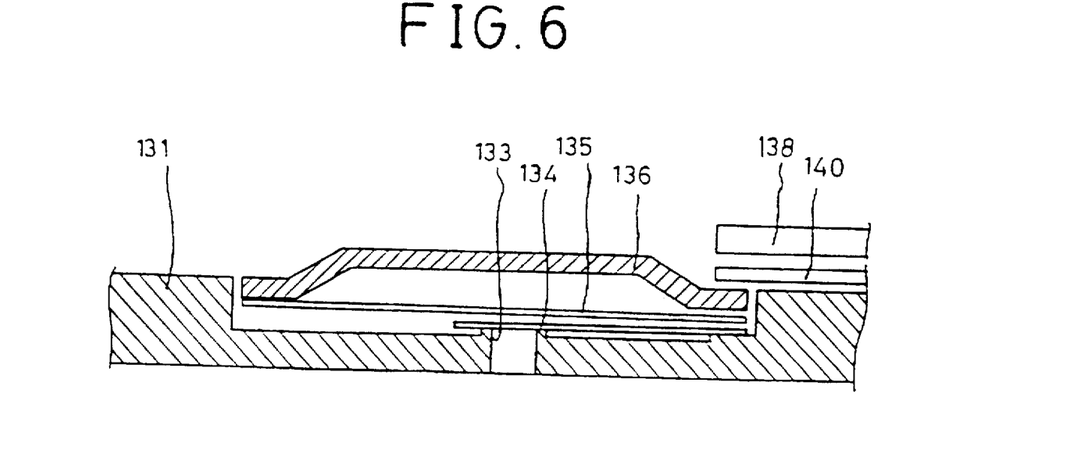
FIG. 6 is a cross-sectional view of a valve device used in a hermetic type compressor according to a first embodiment of the present invention.

An exhaust valve 134 for opening or shutting the exhaust hole 133 is covered on the upper surface of the exhaust hole 133, as shown in FIG. 6.

A valve spring 135 elastically supporting the exhaust valve 134 in a direction of shutting the exhaust valve 134 is disposed thereon. There is a retainer 136 for defining the position of the valve element 134 and valve spring 135 constantly.

According to the first embodiment of the present invention having the aforementioned components, a separate fixed end 136a extended in right angle is formed in one end of the retainer 136, and a fixed groove 132a is extended in the reentrant groove 132 of the cylinder head 131 where the retainer 136 is installed, at a portion corresponding to the fixed end 136a of the retainer 136.

Also, a packing 140 installed between the cylinder head 131 and head cover 138 is constructed such that the packing 140 fixes both fixed ends 136a and 136b of the retainer 136 in the reentrant groove 132 of the cylinder head 131 by the compression force against the head cover 138, being positioned between the upper surface of the both fixed ends 136a and 136b of the retainer 136 and the Lower surface of the head cover 138.

In the thus-constructed valve device used in the hermetic type compressor according to the first embodiment of the present invention, the exhaust valve 134 is installed on the upper surface of the exhaust hole 133 formed in the reentrant groove 132 of the cylinder head 131, the valve spring 135 is installed upwardly with respect to the exhaust valve 134, and the retainer 136 is fixed on the valve spring 135.

At this time, the upper surface of both fixed ends 136a and 136b of the retainer 136 is protruded, compared to that of the cylinder head 131.

In such a state, the packing 140 is inserted into the upper surface of the cylinder head 131 so as to compress the upper surface of the cylinder head 131 and both fixed ends 136a and 136b of the retainer 136, to then couple the cylinder head 131 and head cover 138.

Accordingly, the packing 140 is deformed as much as the protruded portion of both fixed ends 136a and 136b of the retainer 136 by the compression force generated by the connection of the head cover 138 and cylinder head 131, while supplying the exhaust valve 134 and valve spring 135 with a fixing force.

Figure 8:
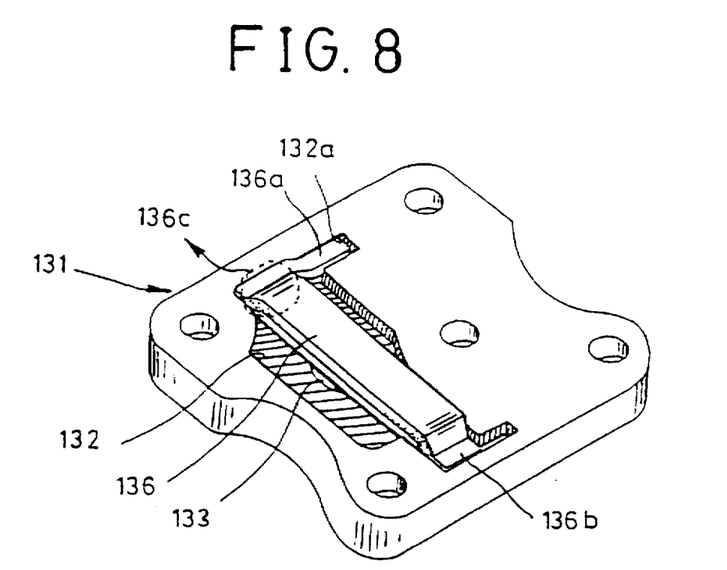
FIG. 8 is a perspective view showing a cylinder head used in the hermetic type compressor according to a first embodiment of the present invention, in a state where a head cover is separated therefrom.

As shown in FIG. 8, in the retainer 136, since a flexible part 136c opposed to one fixed end 136b is flexible by the compressed both fixed ends 136a and 136b, the upper and lower flexible spaces of the valve spring 135 are extended toward the lower surface of the flexible part 136c.

As described above, in the valve device used in the hermetic type compressor according to the first embodiment of the present invention, since the other end 136b of the retainer 136 is fixed by extending one end of the retainer 136 for fixing the exhaust valve 134 and valve spring 135 and the flexible part 136c is not fixed, the exhaust valve 134 is opened or shut smoothly and the space for installing the valve spring 135 can be obtained.

Also, one end of the retainer 136 is extended and the fixed groove 132a of the reentrant groove 132 to which one fixed end 136a of the retainer 136 is fixed is formed in a portion corresponding to the fixed end 136a of the retainer 136, thereby simplifying the structure, improving the productivity and saving the manufacturing cost.

Figure 9:
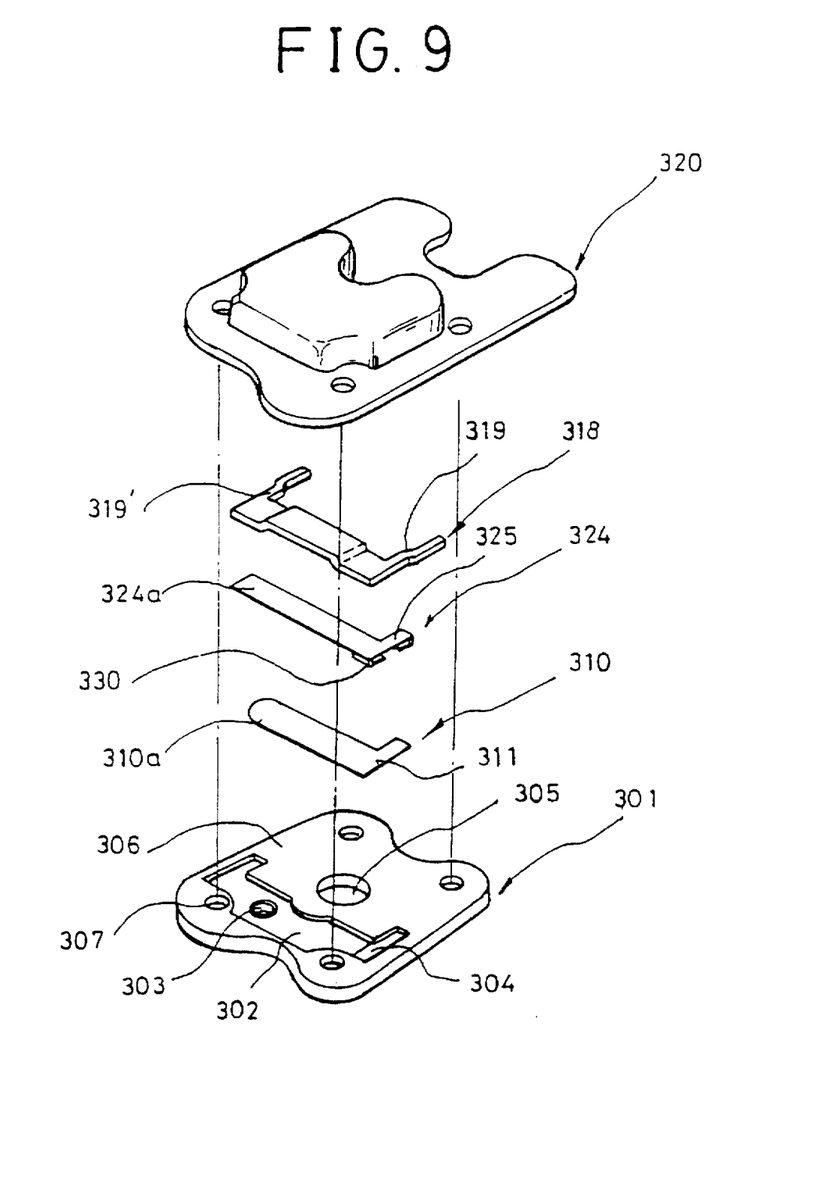
FIG. 9 is an exploded perspective view of a valve device used in a hermetic type compressor according to a second embodiment of the present invention.
Figure 10:
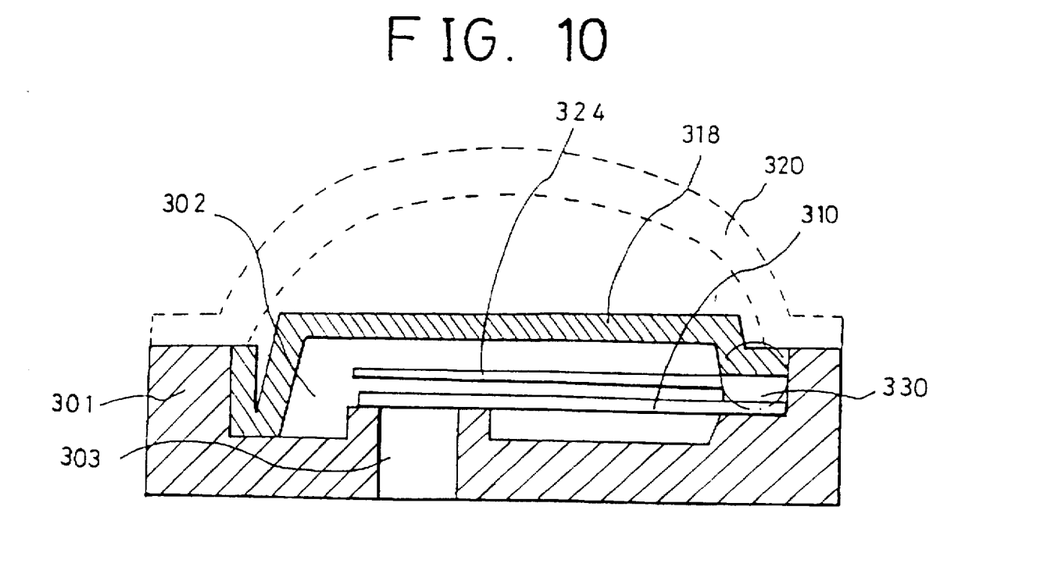
FIG. 10 is a cross-sectional view of a valve device used in a hermetic type compressor according to a second embodiment of the present invention.

In one side of a cylinder head 301 used in a hermetic type compressor according to the second embodiment of the present invention, as shown in FIGS. 9 and 10, a reentrant groove 302 having an exhaust hole 303 is formed. In the other side thereof, a suction hole 305 is formed.

A valve fixing surface 304 is formed in one inner side of the reentrant groove 302, stepwise with respect to the bottom surface of the reentrant groove 302. A fixing piece 311 formed in one side of the exhaust valve 310 for opening or shutting the exhaust hole 303 is installed on the valve fixing surface 304.

A flexible end 310a, the other end of the exhaust valve 310 is compactly installed on the exhaust hole 303.

Also, a spring fixing piece 325 for defining the opening timing and range of the exhaust valve 310 is installed in the valve fixing surface 304 in which one end the exhaust valve 310 is installed.

Figure 11:
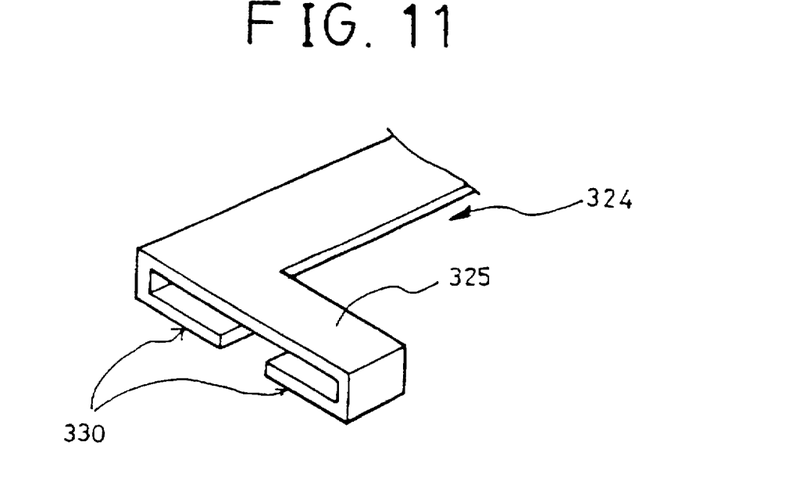
FIG. 11 is a partial perspective view showing a valve spring of the valve device used in a hermetic type compressor according to a second embodiment of the present invention.

At this time, in the second embodiment of the present invention, in order to form a gap between the exhaust valve 310 and valve spring 324, as shown in FIG. 11, a spacer 330 is integrally bent multiple times in both ends of the lower surface of the spring fixing piece 325 of the valve spring 324.

In other words, when the piston (not shown) is proceeded to compress the refrigerant, the exhaust valve 310 is exactly shut by the valve spring 324, thereby compressing the refrigerant exactly. Also, when the piston is retroceded to suck in low-pressure refrigerant, the exhaust valve 310 is exactly shut, thereby preventing the high-pressure refrigerant being inside the head cover 320 from being counter-flown into the cylinder.

The thus-bent spacer used in the second embodiment of the present invention is U-shaped, when the valve spring 324 is viewed from the side of the spring fixing piece 325.

One side of a valve stopper 318 for defining the upward movement of the valve spring 324 is installed in the upper surface of the spring fixing piece 325 installed in the valve spring surface 304.

Downward bent housing fixed parts 319 and 319' are formed in both ends of the valve stopper 318 so that the valve stopper 318 is fixedly installed inside the reentrant groove 302 of the cylinder head 301.

Of the two housing fixed parts 319 and 319', the housing fixed part 319 positioned in one end is installed in the upper portion of the valve fixing piece 311 and spring fixing piece 325 sequentially housed above the valve fixing surface 304, so that the exhaust valve 310 and valve spring 324 are fixed by the locking of the cylinder head 301 and head cover 320.

In fabricating the valve device used in the hermetic type compressor according to the second embodiment of the present invention, the exhaust valve 310, the valve spring 324 having the spacer 330 and the valve stopper 318 are sequentially housed within the reentrant groove 302 of the cylinder head 301, the head cover 320 is screw-locked, with a packing (not shown) inserted into the upper surface 306 of the cylinder head 301, thereby completing the fabrication of the device.

In the valve device used in the hermetic type compressor according to the second embodiment of the present invention, the gap generated due to the spacer 330 between the exhaust valve 310 and valve spring 324 is an important factor in defining the opening timing and range of the exhaust valve 310. In the second embodiment of the present invention, an exact gap is easily formed by the spacer 330.

Figure 12:
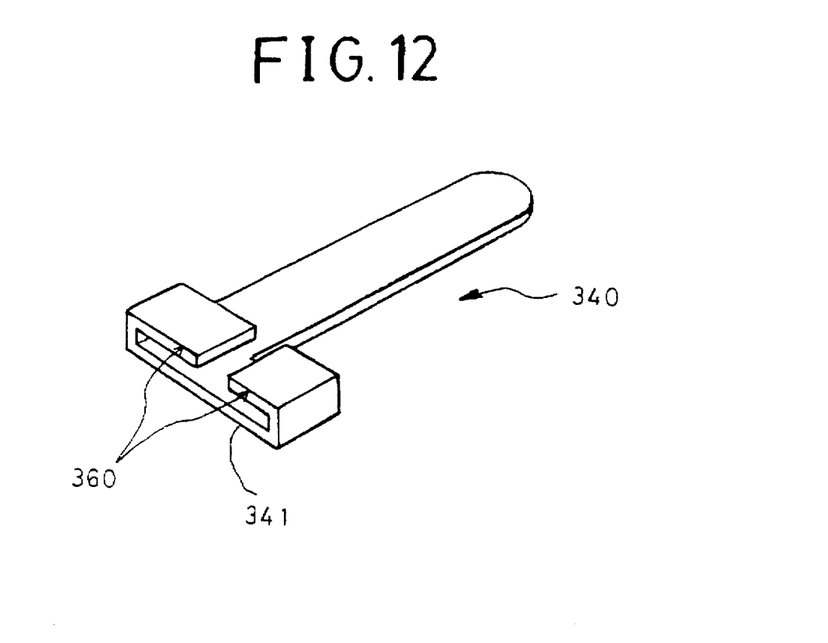
FIG. 12 is a perspective view showing a valve spring of a valve device used in a hermetic type compressor according to a third embodiment of the present invention.

According to an exhaust valve 340 used in a third embodiment of the present invention, a spacer 360 is integrally bent in the upper surface of the valve fixing piece 341 of the exhaust valve 340, as shown in FIG. 12.

In the third embodiment of the present invention having the aforementioned structure, the spring fixing piece 325 of the valve spring 324 is housed in the upper surface of the exhaust valve 340 in which the spacer 360 housed in the valve fixing surface 304 provided within the reentrant groove 302 of the cylinder head 301 for opening or shutting the discharge hole 303. Thus, a predetermined gap is easily formed between the exhaust valve 340 and valve spring 324, thereby exactly controlling the opening timing and range of the exhaust valve 340.

As described above, in the hermetic type compressor according to third and fourth embodiments of the present invention, since the gap between an exhaust valve and a valve spring, which influences on the opening timing and range of the exhaust valve, is exactly kept constant to operate the exhaust valve, refrigerant leakage is not generated through a discharge hole, thereby improving the efficiency of the compressor. Also, since the discharge flow of the high-pressure gas compressed in the cylinder is performed smoothly, noise or vibration is suppressed.

Figure 13:
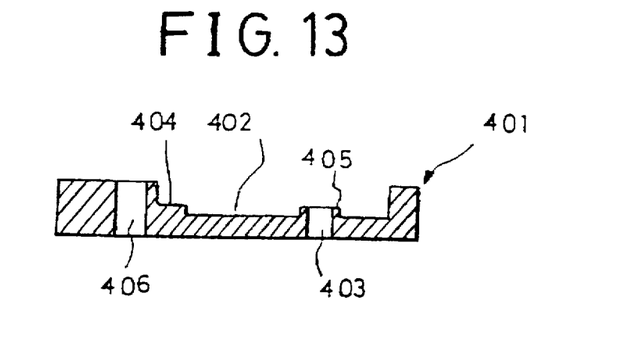
FIG. 13 is a cross-sectional view showing a cylinder head of the valve device used in the hermetic type compressor according to a fourth embodiment of the present invention.

In the cylinder head used in a hermetic type compressor according to the fourth embodiment of the present invention, as shown in FIG. 13, a valve fixing surface 404 and a valve seat surface 405 formed in the outer periphery of the exhaust hole 403, each formed in a reentrant groove 402, are formed to be in the same height with each other within a constant measurement range.

In other words, the cylinder head used in the hermetic type compressor according to the fourth embodiment of the present invention is generally sintered. The thusly sintered cylinder head 401 experiences a fabrication work after the sintering, to then be fabricated as a complete cylinder head 401.

In more detail, in performing the fabrication work after the sintering, a fabrication work of exactly trimming the valve fixing surface 404 in which an exhaust valve (not shown) is fixed is performed, thereby attaining a surface coarsening as a fabrication reference surface for fabricating the valve seat surface 405.

Subsequently, a trimming work for forming the valve seat surface 405 to be in the same height as that of the valve fixing surface 404 within a constant measurement range is performed, using the thus-trimmed valve fixing surface 404 as the reference surface.

Therefore, when the exhaust valve is housed throughout the valve fixing surface 404 and valve seat surface 405, formed in the same height with each other, to fix the valve fixing surface 404, the exhaust valve is in a compact touch with the valve seat surface 405, so that the gap therebetween is not formed, thereby preventing the leakage of the refrigerant through the exhaust valve.

Therefore, if the leakage of the refrigerant through the exhaust valve is prevented, the compression is ensured during the compression stroke. Also, the counter-flow of the high-pressure refrigerant discharged inside the reentrant groove 302 of the cylinder head 401 is not generated during the suction stroke of a piston, thereby noticeably improving the efficiency of the compressor.

Undefined reference numeral 406 is a suction hole.

As described above in detail, the hermetic type compressor according to the present invention allows the flexible space of a valve spring in a state where a cylinder head is not enlarged, thereby making the opening or shutting of an exhaust valve smooth.

Also, since the valve fixing surface and valve seat surface are formed in the same height within a constant measurement range, a gap is not generated between the exhaust valve and valve spring. Further, since the exact distance between the exhaust valve and valve spring is maintained, the opening timing and range of the exhaust valve is exactly controlled, which prevents the leakage of the refrigerant, thereby improving the efficiency of the compressor.

What is claimed is:

1. A hermetic type compressor comprising:

a cylinder head containing a reentrant groove having an exhaust hole through which compressed refrigerant is discharged from inside a cylinder and having a valve seat surface on an outer periphery of said exhaust hole and a valve fixing surface and a reentrant groove formed in said cylinder head;

an exhaust valve element disposed above said exhaust hole so as to open or shut said exhaust hole element, the exhaust valve being disposed such that a fixing end portion formed on a side of said exhaust valve element is positioned on said valve fixing surface;

a valve spring having a spring fixing end portion formed on a side thereof in contact with said exhaust valve element;

a spacer disposed between said exhaust valve element and said valve spring, the spacer being integrally formed with the spring fixing piece of the valve spring;

a valve stopper installed on said valve spring for limiting movement of said valve spring;

a head cover for covering said cylinder head;

a packing inserted between said cylinder head and said head cover for preventing leakage of the refrigerant; and said spacer is formed by bent portions of the spring fixing piece of said valve spring.

* * * * *